ns Patent Office 2,723,270
Patented Nov. 8, 1955

2,723,270

THIOSEMICARBAZONES OF PYRIDYLALDE-HYDES AND PYRIDYLKETONES

John V. Scudi, New York, N. Y., assignor to Nepera Chemical Co. Inc., Yonkers, N. Y., a corporation of New York No Drawing. Application March 29, 1950,
Serial No. 152,744

5 Claims. (Cl. 260—294.8)

This invention relates to new thiosemicarbazones of heterocyclic aldehydes and ketones and particularly to such compounds where the heterocyclic ring is pyridine.

It is an object of this invention to produce a new class of chemical compounds.

It is another object of this invention to produce a new class of chemical compounds having valuable properties including bacteriostatic properties.

Other objects of the invention will be apparent from the disclosure which follows:

In general I prepare our compounds by reacting a thiosemicarbazide with a pyridylaldehyde or a pyridylketone in a solvent. When the pyridylaldehyde or the pyridylketone is soluble in water, water is used as the solvent. When the pyridylaldehydes and pyridylketones are insoluble in water, I use organic solvents, such as methyl, or ethyl alcohol, 1, 4-dioxane, etc., or mixtures of these organic solvents and water. I reflux the reaction mixture for a period of 4 to 12 hours, collect and purify the product obtained as described in the specific examples.

In the production of typical thiosemicarbazones of pyridylaldehydes and pyridylketones, the chemical reaction taking place in my process is believed to be as follows:

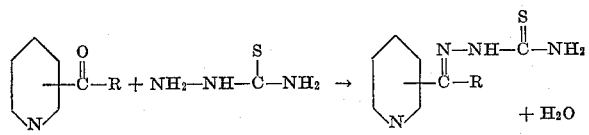

in which R represents a hydrogen or lower alkyl groups containing from one to six carbon atoms. The alkyl groups appearing in the alkylpyridylketones may be saturated or unsaturated, and may be further substituted. The aldehyde or the ketone group of the pyridine ring may be in the 2-, 3-, or in the 4-position. One more of the remaining H— atoms of the pyridine ring may also be substituted with nitro, amino, alkylamino, acylamino, arylamino, alkyl, halogen, cyano, carboxyl, hydroxy, alkoxy, mercapto, alkylmercapto, sulfonic acid, alkylsulfone and other groups.

The following examples disclose the production of illustrative compounds within the scope of my invention, but the invention is not to be considered as limited to the specific process or raw materials disclosed therein or the specific compounds produced thereby.

Example 1

Seven grams of freshly vacuum distilled 2-acetyl pyridine (2-pyridyl, methyl ketone) and 3.65 grams of thiosemicarbazide were placed into a flask with 50 ml. of ethanol (95%). A light yellow color developed immediately. The flask and contents were heated on a water bath until all material dissolved. The heating was continued for about 12 hours, and then cooled and the insoluble product formed was collected on a filter. The filtrate was evaporated under reduced pressure to a volume of 10 ml. and on standing and cooling more of the product precipitated out. The combined crude, light-brown colored product obtained in the process was recrystallized from water with decolorizing carbon, and then from 95% ethanol. The product, $C_8H_{10}N_4S$,2-acetylpyridine-thiosemicarbazone forms white, glistening plates which melt at 158–160° C. (dec.). In a nitrogen determination (Micro-Dumas) there was found $$N = 28.70\%$$

theory 28.84%.

Example 2

Seven grams of freshly vacuum distilled 2-acetylpyridine and 3.65 grams of thiosemicarbazide were placed into a flask with 50 ml. of water. Since neither of the reactants dissolved completely in the water upon heating, 50 ml. of 1,4-dioxane was added and heat applied until a complete solution was obtained. The reaction mixture was then heated and worked up as in Example 1. The recrystallized product obtained had the same melting point, that is, 158–160° C. (dec.)

Example 3

Eight and five-tenths grams of 3-acetylpyridine (3-pyridyl, methyl ketone) and 4.55 grams of thiosemicarbazide were placed into a flask containing 75 ml. of water. The reaction mixture was heated on a water bath for a total of 8 hours. Complete solution of the thiosemicarbazide took place in about 40 minutes. After cooling, the product formed crystallized out and was collected on a filter. After recrystallization from water, the product 3-acetylpyridinethiosemicarbazone formed long, needle like crystals which melt at 217° C. (dec.). In a nitrogen determination (Micro-Dumas) there was found N=29.00%, theory 28.84%.

Example 4

Five grams of 4-acetyipyridine (4-pyridyl, methyl ketone) and 3.64 grams of thiosemicarbazide were placed into a flask containing 200 ml. of water and refluxed for seven hours. After cooling, the precipitated product formed was collected on a filter. The collected precipitate was placed into 250 ml. of water and heated to 90° C. to extract the unreacted thiosemicarbazide. The precipitate was then again filtered and washed with 100 ml. of hot water, sucked dry and recrystallized from absolute ethanol. After drying, the product 4-acetylpyridinethiosemicarbazone melts at 222° C. (dec.). In a nitrogen determination (Micro-Dumas) there was found N=28.90%, theory 28.84%.

Example 5

Five grams of 3-propionylpyridine (3-pyridyl, ethyl ketone) and 3.0 grams of thiosemicarbazide were placed into flask containing 175 ml. of water and refluxed for 12 hours. After cooling, the product formed crystallized out. This was collected on a filter, extracted twice with hot water and dried, and recrystallized from 50% aqueous alcohol. The product 3-propionylpyridinethiosemicarbazone melts at 198° C. (dec.). In a nitrogen determination there was found N=27.9, theory 26.90%.

Example 6

Six and twenty-six-hundredths grams of 3-butyrylpyridine (3-pyridyl, propyl ketone) and 3.44 grams of thiosemicarbazide were placed into a flask containing 100 ml. of Solox (a brand of denatured ethyl alcohol) and 50 ml. of water and refluxed for 14 hours. The solvent was then distilled off under reduced pressure and the residue recrystallized from dilute (66%) ethanol. The product 3-butyrylpyridinethiosemicarbazone melts at 182–183° C. (dec.). In a nitrogen determination there was found N=24.9%, theory, 25.20%.

Example 7

Five grams of 3-pyridylaldehyde and 4.10 grams of thiosemicarbazide were placed into a flask containing 150 ml. of water and refluxed for 6 hours. After standing over night the separated crystals were collected, washed with water, and recrystallized from boiling, distilled water with decoloring charcoal. The almost white crystals were collected and dried. The product, 3-pyridylaldehydethiosemicarbazone, melts at 213° C. (dec.). In a nitrogen determination (Micro-Dumas) there was found $$N = 31.00\%$$

theory 31.09%.

The thiosemicarbazones of pyridylaldehyde and pyridylketones occur as white crystalline substances. They are slightly soluble in water and more readily soluble in alcohols, such as methyl and ethyl alcohols. They are very soluble in glycerine and glycols, such as ethylene and propylene glycols. They are insoluble in benzene, chloroform, ether, and ligroin, but somewhat soluble in dioxane; slightly soluble in vegetable oils.

Their solubility in dilute acids and alkalies indicates that these compounds are amphoteric; that is, they form soluble salts with acids and with alkali metals.

The compounds disclosed herein show bacteriostatic properties.

By following the procedures of Examples 1–6 thiosemicarbazones of other alkylpyridylketones may be produced, such as, valerylpyridinethiosemicarbazone, caproylpyridinethiosemicarbazone, heptoylpyridinethiosemicarbazone and the like.

It will be understood that the raw materials, specific procedure, and products disclosed in the examples merely encompass illustrative embodiments of my invention and the scope of the invention is to be limited only by the terms of the claims appended hereto.

What I claim is:

1. A compound of the following formula

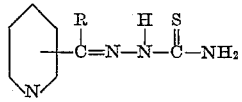

wherein R is lower alkyl.

2. As a new product, 3-acetylpyridinethiosemicarbazone.

3. As a new product, 3-propionylpyridinethiosemicarbazone.

4. As a new product, 2-acetylpyridinethiosemicarbazone.

5. As a new product, 4-acetylpyridinethiosemicarbazone.

References Cited in the file of this patent

Hoggarth: British J. Pharmacol. (1949) 4 pp. 248–253.
Sidgwick: "Organic Chem. of Nitrogen," Oxford Press (1942) 549.